United States Patent
Rusnack et al.

(10) Patent No.: US 9,506,811 B2
(45) Date of Patent: Nov. 29, 2016

(54) METHOD AND APPARATUS FOR THE MULTI-MODAL ACCURATE TEMPERATURE MEASUREMENT AND REPRESENTATION OF TEMPERATURE-CONTROLLED STORED GOODS

(71) Applicant: American Pharma Technologies, LLC, Boise, ID (US)

(72) Inventors: Michael Richard Rusnack, Star, ID (US); Casey Alexander Harris, Las Vegas, NV (US); Marc Roger Hayden, Corvallis, OR (US); Michael Altree, Meridian, ID (US)

(73) Assignee: American Pharma Technologies, LLC, Boise, ID (US)

( * ) Notice: Subject to any disclaimer, the term of this patent is extended or adjusted under 35 U.S.C. 154(b) by 464 days.

(21) Appl. No.: 14/175,709

(22) Filed: Feb. 7, 2014

(65) Prior Publication Data
US 2014/0229137 A1 Aug. 14, 2014

Related U.S. Application Data

(60) Provisional application No. 61/762,310, filed on Feb. 8, 2013.

(51) Int. Cl.
G06F 19/00 (2011.01)
G01K 1/02 (2006.01)
G01K 7/42 (2006.01)

(52) U.S. Cl.
CPC .. G01K 1/02 (2013.01); G01K 7/42 (2013.01)

(58) Field of Classification Search
CPC . H05B 6/06; H05B 2213/06; A61B 5/14532
USPC ................. 702/130, 182–185, 188
See application file for complete search history.

(56) References Cited

U.S. PATENT DOCUMENTS

2001/0042747 A1* 11/2001 Clothier ............... H05B 6/06
219/627

* cited by examiner

Primary Examiner — Edward Raymond
(74) Attorney, Agent, or Firm — Merchant & Gould P.C.

(57) ABSTRACT

Methods and systems for determining a temperature of goods in a temperature controlled unit are disclosed. Raw temperature data is received for a first iteration. The raw temperature data indicates an air temperature inside the temperature controlled unit at the first iteration. A property value for a good stored in the temperature controlled unit is obtained. Based on the raw temperature data for the first iteration and the property value for the good, a first adjusted stored goods temperature is determined for the good. The first adjusted stored goods temperature for the good represents a first internal temperature of the good. Additional iterations are performed, where raw temperature data is received for a second iteration. Based on the raw temperature for the second iteration and the property value for the good, a second adjusted stored goods temperature is determined.

20 Claims, 10 Drawing Sheets

| Iteration Number (n) | Raw Air Temp. (Sampled every 10 min) ($T_A$) | First Container (30 mL Glycol) ($T_n$) | Second Container (1 ml Glycol) ($T_n$) |
|---|---|---|---|
| 1 | 7.81 | 7.81 | 7.81 |
| 2 | 7.81 | 7.81 | 7.81 |
| 3 | 7.81 | 7.81 | 7.81 |
| 4 | 7.04 | 7.81 | 7.81 |
| 5 | 6.59 | 7.80 | 7.41 |
| 6 | 6.69 | 7.54 | 6.97 |
| 7 | 6.96 | 7.35 | 6.82 |
| 8 | 7.25 | 7.27 | 6.89 |
| 9 | 7.55 | 7.26 | 7.09 |
| 10 | 7.55 | 7.26 | 7.33 |
| 11 | 7.82 | 7.33 | 7.45 |
| 12 | 7.8 | 7.33 | 7.64 |
| 13 | 7.8 | 7.33 | 7.73 |
| 14 | 7.02 | 7.34 | 7.76 |
| 15 | 6.62 | 7.33 | 7.37 |
| 16 | 6.73 | 7.18 | 6.97 |
| 17 | 7 | 7.08 | 6.84 |
| 18 | 7 | 7.08 | 6.92 |
| 19 | 7.29 | 7.06 | 6.96 |
| 20 | 7.58 | 7.11 | 7.14 |
| 21 | 7.58 | 7.11 | 7.37 |
| 22 | 7.83 | 7.22 | 7.48 |
| 23 | 7.75 | 7.22 | 7.67 |
| 24 | 6.95 | 7.22 | 7.71 |
| 25 | 6.62 | 7.22 | 7.31 |
| 26 | 6.62 | 7.22 | 6.95 |
| 27 | 6.72 | 7.09 | 6.77 |
| 28 | 7.01 | 7.01 | 6.74 |

FIG. 10

METHOD AND APPARATUS FOR THE MULTI-MODAL ACCURATE TEMPERATURE MEASUREMENT AND REPRESENTATION OF TEMPERATURE-CONTROLLED STORED GOODS

CROSS-REFERENCE TO RELATED APPLICATIONS

This application claims the benefit of U.S. Provisional Application Ser. No. 61/762,310, filed Feb. 8, 2013, titled "Method and Apparatus for the Multi-Modal Accurate Temperature Measurement and Representation of Cold Stored Goods," the disclosure of which is incorporated herein by reference in its entirety.

INTRODUCTION

Temperature controlled environments controlled by heating or refrigeration are commonly used. Refrigeration has many applications, including, but not limited to: household, commercial, medical grade, industrial grade refrigerators and freezers, cryogenic storage units, and air conditioning. The most common use of refrigeration is the storage and safe keeping of perishable goods. When the goods being stored are valuable or they have tight temperature tolerances, proper and accurate measurement and temperature control becomes even more important.

For instance, the United States government has devised protocols to ensure the proper handling of vaccines during transport and storage so that the vaccines are not damaged, altered, or subject to a loss of potency. Vaccines that do not contain live viruses cannot be frozen during transport and subsequent storage. These vaccines, however, must still be refrigerated under specific controlled conditions. Vaccines that contain live viruses must be frozen until they are ready to be administered. Just like food items and other biological products (donated blood and organs), improper transport and storage can cause a vaccine to become inactive, ineffective due to a loss of potency or otherwise adulterated. Both conditions pose a serious health threat to the patient. It is with respect to this general environment that embodiments disclosed herein are directed.

SUMMARY

This summary is provided to introduce a selection of concepts in a simplified form that are further described below in the Detailed Description. This summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

In one aspect, the technology relates to a computer-implemented method for determining a temperature of goods in a temperature controlled unit. The method includes receiving raw temperature data for a first iteration, wherein the raw temperature data indicates an air temperature inside the temperature controlled unit at the first iteration. The method also comprises obtaining a property value for a good stored in the temperature controlled unit and based on the raw temperature data for the first iteration and the property value for the good, determining a first adjusted stored goods temperature for the good stored in the temperature controlled unit, wherein the first adjusted stored goods temperature for the good represents a first internal temperature of the good. The method further includes receiving raw temperature data for a second iteration, wherein the raw temperature data indicates an air temperature inside the temperature controlled unit at the second iteration and the raw temperature data for the first iteration is different from the raw temperature data for the second iteration. The method also includes based on the raw temperature data for the second iteration and the property value for the good, determining a second adjusted stored goods temperature for the good stored in the temperature controlled unit, wherein the second adjusted stored goods temperature for the good represents a second internal temperature of the good.

In an embodiment, an adjusted stored goods temperature is determined for additional iterations to represent cyclical changes in raw temperature. In another embodiment, the method further comprises displaying data representing the first and second adjusted stored goods temperatures for the good. In yet another embodiment, the method further comprises comparing data representing the first adjusted stored goods temperature of the stored good with a temperature tolerance for the good; and based on the comparison of the data representing the first adjusted stored goods temperature of the good and the temperature tolerance for the a good, initiating an alert. In still another embodiment, the method further comprises comparing data representing the first adjusted stored goods temperature of the good with a set temperature range of the temperature controlled unit, and based on the comparison of the data representing the adjusted stored goods temperature of the good and the set temperature range of the temperature controlled unit, initiating cooling of the temperature controlled unit.

In an embodiment of the above described technology, the property for the good is one of the group consisting of: volume of the good, geometry of the good, and density of the good. In another embodiment, the method further comprises determining at least one k value for the good stored in the temperature controlled unit, wherein the k value represents the combined properties of the good, wherein determining the adjusted stored goods temperature for the good is further based on the k value. In yet another embodiment, determining the adjusted stored goods temperature for the good stored in the temperature controlled unit is further based on the relationship $T(t)=T_A+(T_0-T_A)e^{-kt}$, wherein $T(t)$ represents temperature of the good at time "t"; $T_A$ represents the ambient temperature (the temperature of the surroundings); $T_0$ is initial temperature of the stored goods; k is a positive constant that represents at least one property of the stored good, and t is the time. In still another embodiment, the method further comprises determining a $k_{warm}$ and a $k_{cool}$ value for the good stored in the temperature controlled unit, wherein the $k_{warm}$ and $k_{cool}$ values represent the combined properties of the good; and wherein determining the adjusted stored goods temperature for the good is further based on the $k_{warm}$ and $k_{cool}$ values.

In another embodiment of the above described technology, the method further comprises determining if the air temperature inside the temperature controlled unit is rising or falling. In yet another embodiment, determining the adjusted stored goods temperature for at least one good stored in the temperature controlled unit is further based on the relationships $T_n=T_A+(T_{n-1}-T_A)e^{-k_{cool}\Delta t}$ and $T_n=T_A+(T_{n-1}-T_A)e^{-k_{warm}\Delta t}$, wherein $T_n$ is the adjusted stored goods temperature of the good for the nth iteration; $T_A$ is the ambient temperature of the temperature controlled unit as measured; $T_{n-1}$ is the adjusted stored goods temperature of the stored good from the previous iteration; $k_{cool}$ is a positive constant representative of the properties of the good when a cooling condition is determined; $k_{warm}$ is a positive constant representative of the properties of the good when a warming condition is determined; $\Delta t$ is the time between measurement iteration; and n is the iteration number. In still another embodiment, the method further comprises obtaining a property value for a second good stored in the temperature controlled unit, wherein the second good is different from the first good, based on the raw temperature data for the first iteration and the property value for the second good, determining an adjusted stored goods temperature for the second good stored in the temperature controlled unit, wherein the adjusted stored goods temperature for the second good represents the internal temperature of the second good, and based on the raw temperature data for the second iteration and the property value for the second good, determining an adjusted stored goods temperature for the second good stored in the temperature controlled unit, wherein the adjusted stored goods temperature for the good represents the internal temperature of the good.

In another aspect, the technology relates to a system for determining the temperature of stored goods in a temperature controlled unit. The system comprises a temperature analysis unit comprising a processor and a memory, wherein the memory stores instructions for causing the processor to perform the operations of: receiving raw temperature data, wherein the raw temperature data indicates an air temperature inside the temperature controlled unit; obtaining a property value for at least one good stored the temperature controlled unit; and based on the raw temperature data and the property value for the good, determining the adjusted stored goods temperature for the good stored in the temperature controlled unit, wherein the adjusted stored goods temperature for the good represents the internal temperature of the good.

In an embodiment, the instructions further comprise instructions for causing the processor to perform the operation of determining additional adjusted stored goods temperatures for additional iterations to represent cyclical changes in raw temperature. In another embodiment, the system further comprises a utilization device, wherein the utilization device displays data representing the adjusted stored goods temperature of the good. In yet another embodiment, the system further comprises a utilization device, wherein the utilization device is configured to: compare data representing the adjusted stored goods temperature of the stored good with a temperature tolerance for the good; and based on the comparison of the data representing the adjusted stored goods temperature of the good and the temperature tolerance for the good, initiate an alert when the adjusted stored goods temperature is outside the temperature tolerance. In still another embodiment, the instructions further comprise instructions for causing the processor to perform the operations of: determining at least one k value for the good stored in the temperature controlled unit, wherein the k value represents the combined properties of the good; and wherein determining the adjusted stored goods temperature for the good is further based on at least one k value.

In another embodiment of the system, determining the adjusted stored goods temperature for the good stored in the temperature controlled unit is further based on the relationship $T(t)=T_A+(T_0-T_A)e^{-kt}$, wherein $T(t)$ represents temperature of the good at time "t"; $T_A$ represents the ambient temperature (the temperature of the surroundings); $T_0$ is initial temperature of the stored goods; k is a positive constant that represents at least one property of the good, and t is the time. In yet another embodiment, the instructions further comprise instructions for causing the processor to perform the operations of: determining a $k_{warm}$ and a $k_{cool}$ value for the good stored in the temperature controlled unit, wherein the $k_{warm}$ and $k_{cool}$ values represent the combined properties of the good; and wherein determining the adjusted stored goods temperature for the good is further based on the $k_{warm}$ and $k_{cool}$ values. In still another embodiment, determining the adjusted stored goods temperature for the good stored in the temperature controlled unit is further based on the relationships $T_n=T_A+(T_{n-1}-T_A)e^{-k_{cool}\Delta t}$ and $T_n=T_A+(T_{n-1}-T_A)e^{-k_{warm}\Delta t}$, wherein $T_n$ is the adjusted stored goods temperature of the good for the nth iteration; $T_A$ is the ambient temperature of the temperature controlled unit as measured; $T_{n-1}$ is the adjusted stored goods temperature of the stored good from the previous iteration; $k_{cool}$ is a positive constant representative of the properties of the good when a cooling condition is determined; $k_{warm}$ is a positive constant representative of the properties of the good when a warming condition is determined; $\Delta t$ is the time between measurement intervals; and n is the interval number.

In another aspect, the technology relates to a computer-readable storage medium encoding computer-executable instructions that, when executed by at least one processor, perform a method for determining a temperature of goods in a temperature controlled unit. The method includes receiving raw temperature data for a first iteration, wherein the raw temperature data indicates an air temperature inside the temperature controlled unit at the first iteration. The method also comprises obtaining a property value for a good stored in the temperature controlled unit and based on the raw temperature data for the first iteration and the property value for the good, determining a first adjusted stored goods temperature for the good stored in the temperature controlled unit, wherein the first adjusted stored goods temperature for the good represents a first internal temperature of the good. The method further includes receiving raw temperature data for a second iteration, wherein the raw temperature data indicates an air temperature inside the temperature controlled unit at the second iteration and the raw temperature data for the first iteration is different from the raw temperature data for the second iteration. The method also includes based on the raw temperature data for the second iteration and the property value for the good, determining a second adjusted stored goods temperature for the good stored in the temperature controlled unit, wherein the second adjusted stored goods temperature for the good represents a second internal temperature of the good.

BRIEF DESCRIPTION OF THE DRAWINGS

There are embodiments shown in the drawings, it being understood, however, that the technology is not limited to the precise arrangements and instrumentalities shown.

FIG. 10 is a table displaying sample data for an example application of the methods and systems disclosed herein.

DETAILED DESCRIPTION

Figure 1:
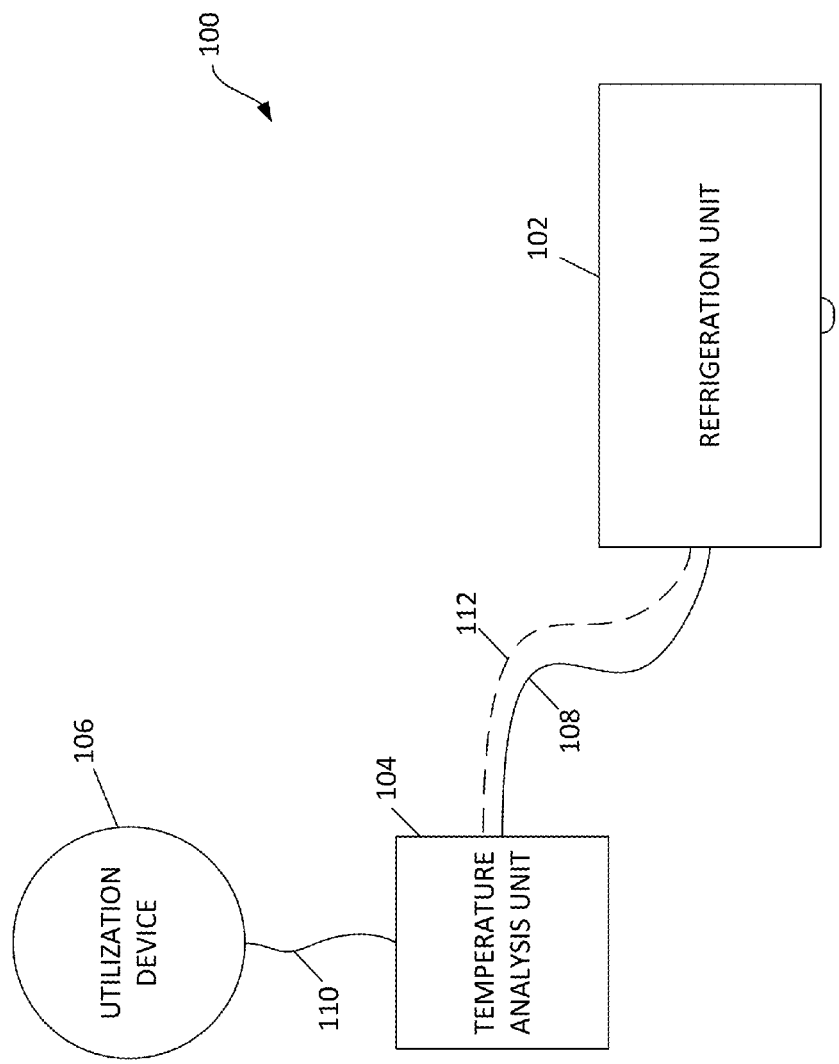
FIG. 1 depicts an example of an environment in which embodiments of present application may be implemented.

Temperature controlled units, such as refrigerators, freezers, and heaters, are being utilized to store and maintain such perishable goods at critical temperatures with tighter tolerances. As with any mechanical system, variation and deviation from the set point occurs. For high-value goods, such as pharmaceuticals, vaccines, proteins and tissue samples, knowledge of the actual temperature of the stored goods (content temperature) may be important, especially when the air temperature is fluctuating due to external events. Knowledge of the actual temperature is also important to maintain potency of the goods and decrease risk of adverse events in patients due to temperature excursions. As such, there is a need for a monitoring solution that can accurately determine internal temperatures, ensure that proper operation is being maintained, determine aberrant behavior, and provide notification in the event of a deviation from the temperature control limits.

When storing temperature sensitive materials where the correct and accurate representation of the temperature of the individual stored goods is necessary, simple air temperature measurement is often inadequate. Using a single, centralized air temperature measurement and knowledge of the stored goods, the temperature data may be analyzed based on the composition, area of the container and volume of the stored material. From the air temperature data, an accurate representation of the temperature of each of the stored goods is developed and may be presented and utilized.

The present application relates to a process and a system for temperature monitoring of samples or other goods stored in a temperature controlled environment, such as a refrigerator, freezer, or heater. Temperature controlled units are generally equipped with temperature sensors, which emit an electric temperature signal. That temperature signal is in turn used by an electronic control system to regulate the operation of a compressor such that the temperature in the temperature controlled unit remains in a preset nominal range. Such sensors are often attached to a wall of the storage space of a temperature controlled unit and essentially detect the prevalent ambient air temperature in the storage space. The ambient temperature inside the storage device, however, is frequently subject to strong short and long-term fluctuations, such as when a door of the refrigerator is opened, upon equipment malfunction, or upon complete shutdown of the compressor. While the methods and systems disclosed herein apply to the use of any temperature controlled unit or environment, for convenience, a refrigerator or freezer is commonly used as an example or embodiment of a temperature controlled unit. Those with skill in the art will appreciated that the methods and systems may be used with other forms of temperature controlled units, such as heaters.

The air temperature detected by the sensors, however, does not accurately represent the actual temperature of the stored goods stored inside. The internal temperature of the goods may or may not change due to a brief influx of warm air into the refrigerator. Many other factors also have an impact on the internal temperatures of the goods inside the storage space. The result can be that stored goods perish early or undergo a loss in quality when they are subjected to an environment which is unsuitable, such as being too warm or too cold for them. Thus, it would be useful to have a monitoring system that could accurately determine the temperature of the stored goods, rather than just the air temperature of the storage space.

First, an understanding of the operation of refrigerators is helpful in understanding the present application. In general, a refrigerator takes advantage of heat exchange by compressing gas. A compressor compresses a gas, causing the gas to heat, and the heated gas is passed through a set of coils outside the interior of the refrigerator allowing the heat to dissipate and the gas to condense into a liquid. The high pressure liquid then passes through an expansion valve to a low pressure area, allowing the pressurized liquid to expand and vaporize, causing its temperature to drop inside the refrigerated storage area. The cooled gas is then drawn into the compressor, and the cycle repeats. Thus, when the compressor is on, the refrigerator is cooling the refrigerated storage space. Those with skill in the art will appreciate other refrigeration methods or variations in the above description.

To attempt to maintain a semi-stable temperature in the refrigerator, the compressor needs to be turned on and off. To maintain a set temperature, a refrigerator cools the interior space to below the desired temperature and then stops cooling. When the active cooling stops, the internal temperature slowly rises until the air temperature reaches a tolerance level above the set temperature where the controls restart the compressor. Active cooling of the interior space begins again until the interior space reaches a temperature below the set temperature. This cycle continuously repeats itself. This activity results in the measured air temperature to be cyclic in nature. The very nature of this cooling cycle presents challenges in the measurement and the determination of the precise internal temperature of the goods being stored. While the cooling cycle itself provides variation in temperature, other external events create even more variation, such as opening and closing the door or adding or removing goods, equipment malfunction or power failure. Additionally, other temperature controlled units, such as heaters, exhibit similar cyclical properties.

To lessen the effect of the air temperature swings, the tip of the air-temperature-measurement device may be placed in a vessel filled with a substance, such as glycol and water. This technique is known as "buffering." The temperature measured is then the temperature of the substance, not the ambient air temperature. This has the effect of dampening the temperature swing caused by the cooling cycle or other external events.

The "buffering" method, however, still fails to accurately determine the temperature of the goods being stored in the refrigerator. For example, if the volume of a stored good is less than that of the substance-filled vessel, the stored good may not be accurately reflected by the measured temperature of the substance-filled vessel. The present application solves that problem by determining the temperature of the individually stored goods in the refrigerator from analysis of the measured air temperature, even without a substance-filled vessel surrounding the temperature sensor. The air temperature is utilized in the determination of internal temperatures for the individually stored goods for each given volume and vessel geometry. Once the correct temperature of the stored goods is determined, that temperature may be utilized for many different purposes.

FIG. 1 depicts an example of an environment 100 in which embodiments of present application may be implemented. Depicted in environment 100 is a refrigeration unit 102, a temperature analysis unit 104, and a utilization device 106. The refrigeration unit 102 may be any refrigeration unit known to those of skill in the art. For instance, in one embodiment, the refrigeration unit 102 is a medical grade refrigerator. In another embodiment, the refrigeration unit 102 may be specialized for a particular use. The refrigeration unit 102 is depicted in further detail in FIG. 2. The refrigeration unit is an embodiment of a temperature controlled unit, and those with skill in the art will understand the temperature controlled unit could also be a heater.

In an embodiment, the refrigeration unit 102 contains a temperature sensor that sends temperature data to the temperature analysis unit 104 via a connection 108. The connection 108 may be a wired or wireless connection. For example, the refrigeration unit 102 and the temperature analysis unit 104 may be connected by a hardwire, wired USB, CAT5, coaxial, fiber optic, or any other of the many wired connection options known to those of skill in the art. As another example, the connection 108 may be a wireless connection, such as a connection via the Internet, wireless networks, Bluetooth®, infrared or any other of the many wireless connection options known to those of skill in the art. As such, the temperature analysis unit 104 may be located anywhere. In some embodiments, the temperature analysis unit 104 is located remotely from the refrigeration unit 102. In other embodiments, the temperature analysis unit 104 is integrated into the refrigeration unit 102.

The temperature analysis unit 104 receives temperature data from the refrigeration unit 102. The temperature data sent by the refrigeration unit 102 may be referred to herein as the "raw temperature data." The temperature data received from the refrigeration unit 102 is analyzed by the temperature analysis unit 104 to determine the temperatures of the goods stored in the refrigeration unit 102. This temperature of the goods stored in the refrigeration unit 102 as determined by the temperature analysis unit 104 may be referred to herein as the "adjusted stored goods temperature." The temperature analysis unit 104 is discussed in further detail below with reference to FIG. 3.

Once the temperature analysis unit 104 has analyzed the temperature data received from the refrigeration unit 102, the temperature analysis unit may send that information to the utilization device 106 via connection 110. Like connection 108, connection 110 may also be wired or wireless. Additionally, in some embodiments, the utilization device 106 may be integrated directly into the temperature analysis unit 104.

The utilization device 106 may be a multitude of devices or include a multitude of different devices and/or functions. In one embodiment, the utilization device 106 is a display device. In such an embodiment, the utilization device 106 is able to display the adjusted stored goods temperature for each of the stored goods. Additionally, the history of the adjusted stored goods temperature may be displayed as a chart or graph, or also as a spreadsheet of data or other electronic means along with many other display options. Further, the adjusted stored goods temperature may be displayed with the raw temperature data that was received by the temperature analysis unit 104 from the refrigeration unit 102. By displaying the adjusted stored goods temperature for individual stored goods, a user can quickly determine if the goods have spoiled or have been outside a predetermined tolerance range. By having this information, in the case of medicines, medical professionals can prevent the administration of potentially spoiled medication.

In other embodiments, the utilization device 106 may be an alarm or alert device. In such embodiments, the utilization device 106 receives the adjusted stored goods temperature data from the temperature analysis unit 104, and based on that data, initiates an alarm or alert if the adjusted stored goods temperature data is outside a certain threshold. For instance, if the adjusted stored goods temperature data indicates that the temperature of a particular stored good has risen above a certain temperature, the utilization device 106 may initiate an alarm or alert to indicate that the storage unit has exceeded temperature and urgent action is required. Additionally, the utilization device 106 may initiate an alarm or alert to indicate that the adjusted stored goods temperature of a particular stored good is rising or falling at an unacceptable rate. Such an alarm would allow a control system or a user to adjust the refrigeration unit as necessary. As will be appreciated by those with skill in the art, the utilization device 106 may include additional functionality or comprise additional devices to further utilize the adjusted stored goods temperature data.

In some embodiments, an additional connection 112 may also be included to further connect the temperature analysis unit 104 to the refrigeration unit 102. Connection 112 allows the temperature analysis unit 104 to transmit the adjusted stored goods temperature data back to the refrigeration unit 102. Like connection 108 and connection 110, connection 112 may be wired or wireless. The refrigeration unit 102 may utilize the adjusted stored goods temperature data in controlling the refrigeration cycle instead of, or in combination with, the raw temperature data it would otherwise utilize. By utilizing the adjusted stored goods temperature data, the control system of the refrigeration unit 102 is able to more accurately control the temperature of the goods inside the refrigeration unit 102.

Figure 2:
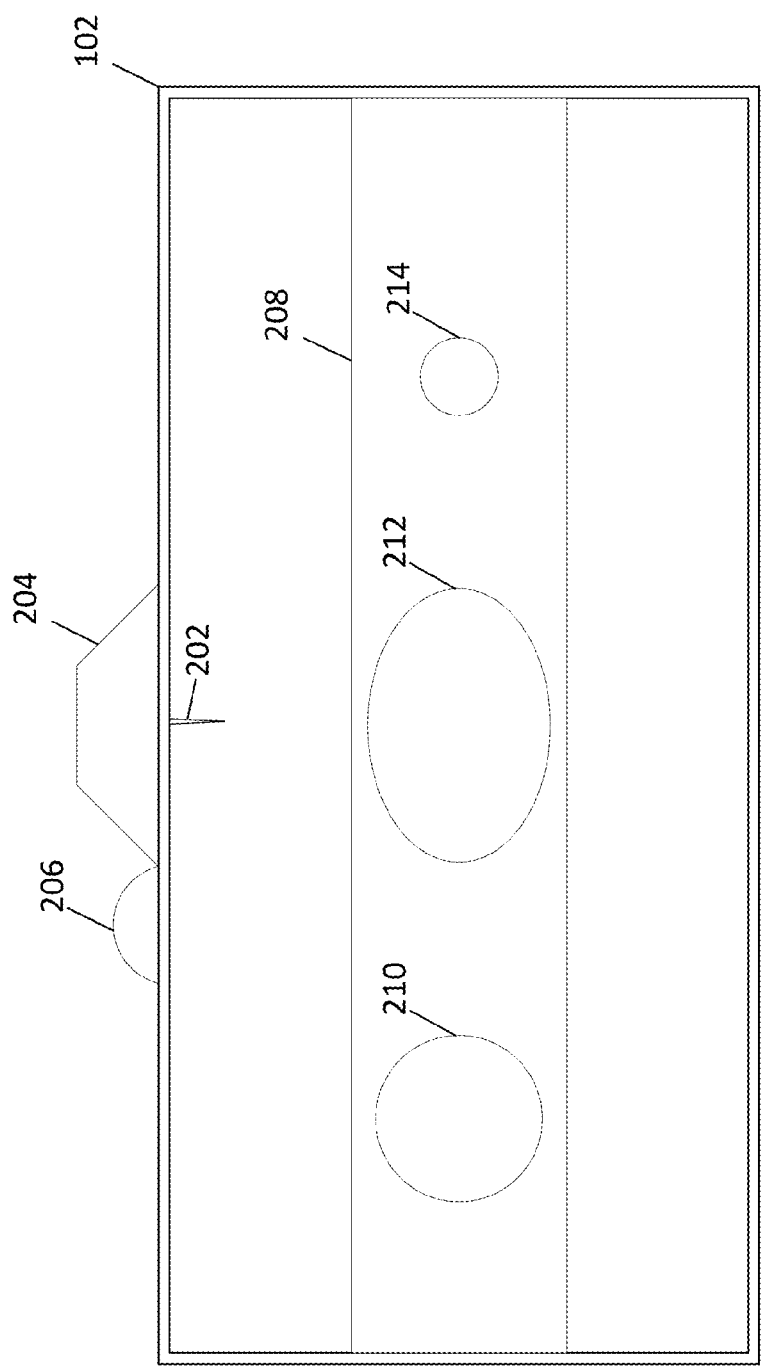
FIG. 2 depicts a more detailed view of an embodiment of refrigeration unit.

FIG. 2 depicts a more detailed view of an embodiment of the refrigeration unit 102. As depicted in FIG. 2, the refrigeration unit 102 contains a temperature sensor 202, a compressor 204, a control unit 206, a storage component 208, and stored goods 210-214. FIG. 2 depicts a top-view of a chest-type refrigeration unit with the cover removed for viewing. As discussed above, the refrigeration unit 102 may be any type of refrigeration device known to those of skill in the art.

In the refrigeration unit 102, three different stored goods 210, 212, 214 are located inside the refrigeration unit 102 and supported by the storage component 208. The stored goods 210, 212, 214 may be any type of goods needing refrigeration. Additionally, the storage component 208 may be any type of component or device that can be utilized for supporting or storing the stored goods, such as a shelf or a rack.

The temperature sensor 202 is located inside of the refrigeration unit 102. The temperature sensor generally measures the air temperature of the inside of the refrigeration unit 102. Although depicted as placed on the center of a wall of the refrigeration unit 102, the temperature sensor 202 may be placed anywhere within the refrigeration unit 102. For instance, the temperature sensor 202 may be placed in the center of the refrigeration unit 102. The temperature sensor 202 may be almost any temperature sensor known to those having skill in the art. For instance, the temperature sensor 202 may be a thermistor, a resistance temperature detector, a thermocouple, a semiconductor, or analog or digital reading thermometers, among other types. In some embodiments, where the temperature fluctuates rapidly within the refrigeration unit 102 due to the compressor on/off cycling, the temperature sensor 202 has a high sampling rate to facilitate accurate measurement.

The compressor 204 works as described above to cool the inside of the refrigeration unit 102. In some embodiments, the control unit 206 controls the compressor 204 based on the temperature data generated by the temperature sensor 202. In other embodiments, as discussed above with reference to FIG. 1, the control unit 206 may also control the compressor 204 based on the adjusted stored goods temperature data it receives from the temperature analysis unit 104.

In embodiments, the control unit 206, the temperature sensor 202, or another component of the refrigeration unit 102 may be responsible for generating and transmitting the raw temperature data to the temperature analysis unit 104 as discussed above with reference to FIG. 1. The raw temperature data may be transferred in any form that is known to those having skill in the art, including as both analog and/or digital signals.

Figure 3:
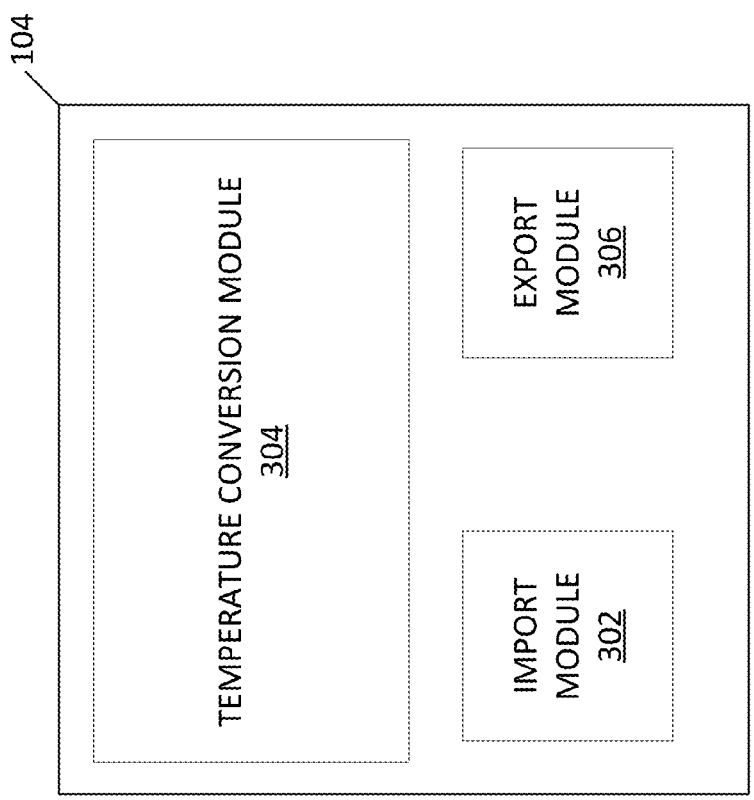
FIG. 3 depicts an embodiment of the temperature analysis unit.

FIG. 3 depicts an embodiment of the temperature analysis unit 104. As depicted, the embodiment of temperature analysis unit 104 comprises an import module 302, a temperature conversion module 304, and an export module 306. The modules may consist of hardware or software, along with combinations of both hardware and software. The import module 302 imports the raw temperature data from the refrigeration unit 102. In some embodiments, the import module 302 may also convert or adjust the data so that it is in a usable form for the temperature conversion module 304 to utilize.

Once the raw temperature data has been imported by the import module 302, the temperature conversion module 304 analyzes and converts the raw temperature data to the adjusted stored goods temperature. The conversion is accomplished, in part, by utilizing raw temperature data and properties of the stored goods. Such properties of the stored goods may include the vessel volume, surface area, shape geometry and stored material density.

In some embodiments, the raw temperature data is converted based on the following determinations. When cooling and heating a good, there is a relationship between the change in ambient air temperature and the change in the temperature of the good. That relationship may be represented by the following equation:

$$T(t)=T_A+(T_0-T_A)e^{-kt}$$

In that relationship, T(t) represents temperature of the good at time "t"; $T_A$ represents the ambient temperature (the temperature of the surroundings); $T_0$ is the initial temperature of the stored goods; k is a positive constant that represents different properties of the stored goods, and t is the time.

Because a good may exhibit different characteristics when the air temperature is decreasing (cooling) or increasing (heating), in some embodiments, it may be useful to recognize the distinct relationship of the good to the surrounding environments. For instance, when the air temperature is cooling, the relationship is:

$$T(t)=T_A+(T_0-T_A)e^{-k_{cool}t}$$

In such a relationship, $k_{cool}$ is a cooling constant matching the stored good properties. Where the air temperature is heating, the relationship is:

$$T(t)=T_A+(T_0-T_A)e^{-k_{warm}t}$$

In such a relationship, $k_{warm}$ is a warming constant matching the stored good properties.

From this relationship, $k_{cool}$ and $k_{warm}$ may be determined from empirical testing by directly measuring the ambient temperature and the temperature of the good over a period of time. The k values are constants that are based on and represent at least one of the properties of a particular good and its container, such as: volume, surface area, density, and shape, etc. As such, the k values may also be determined by additional derivations. For instance, the k values may be proportional to A/(m*c*R), where A is the surface area of the good, m is the mass of the good, and c is the specific heat of the good. Once $k_{cool}$ and $k_{warm}$ are determined or obtained for a particular good, the relationships discussed above may be applied by the temperature conversion module 304 to determine the adjusted stored goods temperature.

The constants $k_{cool}$ and $k_{warm}$ are unique to each stored good. The computation that yields T(t)—the temperature of each stored good at time t, uses the appropriate k values associated with each specific stored good. In this manner, the internal temperature of multiple goods stored in proximity to each other may be calculated independently from a single raw air temperature measurement.

In some embodiments, the initial temperature of the good, $T_0$, will be known at the time of placing it in the refrigeration unit 102. Additionally, the initial temperature of the good, $T_0$, may be directly measured in the refrigeration unit 102. In other embodiments, the initial temperature of the good, $T_0$, may be estimated. For instance, in some embodiments it is presumed the stored good is approximately at equilibrium with the air temperature and $T_0$ may be assumed to be the first measured $T_A$. As such, by receiving the raw temperature data, the temperature conversion module 304 is able to determine the temperature of a stored good.

Due to the cyclic nature of the ambient temperatures in the refrigerator, it is useful to take frequent samples of the ambient air temperatures to use in the equation. For instance, if the frequency of the samples is not high enough, some of the cyclic nature or frequent temperature aberrations of the data may be missed. The frequency of sampling may be done at a fixed rate or at a variable rate. The above equations and relationships are then applied for each sample of the ambient air temperature to determine the adjusted stored goods temperature at the time of the sample for the different goods within the refrigerator. As such, this determination is applied iteratively. One example of such an application is described below.

One example of a process used to convert the raw temperature data into the adjusted stored goods temperature data follows. To determine the adjusted stored goods temperature of a stored good, an iterative process may be used that allows for the changes in ambient air temperature to be reflected in the adjusted stored goods temperature. As discussed above, the raw temperature data may be sampled at a variable rate or at a fixed rate. In the following example, the raw temperature data is sampled at a fixed rate. In this example, the following equation is utilized to complete the iterative process:

$$T_n=T_A+(T_{n-1}-T_A)e^{-k_{cool}\Delta t};\ T_n=T_A+(T_{n-1}-T_A)e^{-k_{warm}\Delta t}$$

Where: $T_n$ is the adjusted stored goods temperature of the good for the nth iteration; $T_A$ is the ambient temperature of the refrigerator as measured; $T_{n-1}$ is the adjusted stored goods temperature of the stored good from the previous iteration; $k_{cool}$ is a positive constant representative of the properties of the good when a cooling condition is determined; $k_{warm}$ is a positive constant representative of the properties of the good when a warming condition is determined; $\Delta t$ is the time between measurement intervals; and n is the interval number.

In this example, $k_{cool}$ and $k_{warm}$ are known (or determined as discussed above) and the time interval ($\Delta t$) is fixed, the equations can be rewritten as:

$$T_n = T_A + C_{cool}(T_{n-1} - T_A); \ T_n = T_A + C_{warm}(T_{n-1} - T_A)$$

Where $C_{cool} = e^{-kcool\Delta t}$ and $C_{warm} = e^{-kwarm\Delta t}$.

The equation with $C_{cool}$ is utilized when a cooling condition is determined, and the equation with $C_{warm}$ is utilized when a warming condition is determined. A sample application of this example is shown in FIG. 10 which displays a table showing sample data. As can be seen, the raw temperature data in column 2 of the table is sampled at a fixed rate. In this example, that fixed rate is 10 minutes. As stated above, however, this rate could be much smaller or larger depending on the desired application. Column 3 displays the determined adjusted stored goods temperature for each iteration of a first container in storage with the same properties as a 30 ml glycol bottle. Column 4 shows the adjusted stored goods temperature for each iteration for a second container in storage with the same properties as a 1 ml glycol bottle. In this example, the $k_{warm}$ for the first good was 0.0013 and the $k_{cool}$ was 0.0495135. The $k_{warm}$ for second good was 0.1557 and the $k_{cool}$ was 0.1484. The $k_{warm}$ values were utilized where there was a change in air temperature that was positive, and the $k_{cool}$ values were used when the change in air temperature was negative. While only 28 iterations are shown in the table, there could be a potentially infinite amount of iterations to continually monitor the temperature of the stored goods. Additionally, the data in the table could be presented in other forms, such as charts or graphs.

The temperature conversion unit 304 is able to convert the raw temperature data into an adjusted stored goods temperature for each individual good stored in the refrigeration unit 102. For example, for stored good 210, the temperature conversion module 304 is able to determine the internal temperature of the stored good 210 from the raw temperature data when the $k_{warm}$ and $k_{cool}$ are known for stored good 210. More specifically, the temperature conversion module determines if the air temperature is heating or cooling by analyzing the raw temperature data, and then utilizes the appropriate relationship from above to determine the temperature of the stored good 210. The temperature conversion module 304 is also able to determine the temperature of the other stored goods 212, 214 from the raw temperature data by using the respective $k_{warm}$ and $k_{cool}$ values, despite the stored goods 212, 214 being different from each other and stored good 210.

In other embodiments, only one k value is utilized in the calculation, and the difference between the potential $k_{warm}$ and $k_{cool}$ values is not accounted for. In such embodiments, the single k value may be the average of $k_{warm}$ and $k_{cool}$.

Once the adjusted stored goods temperature for the desired stored goods has been determined by the temperature conversion module 304, the adjusted stored goods temperature data is exported from the temperature analysis unit 104 by the export module 306. In some embodiments, the export module 306 exports the adjusted stored goods temperature data to the utilization device 106. In other embodiments, the export module 306 exports the adjusted stored goods temperature data to the refrigeration unit 102 to be used by the control unit 206 to control the refrigeration cycles. Export module 306 may also convert the adjusted stored goods temperature data to a different form depending on the final destination of the adjusted stored goods temperature data.

Figure 4:
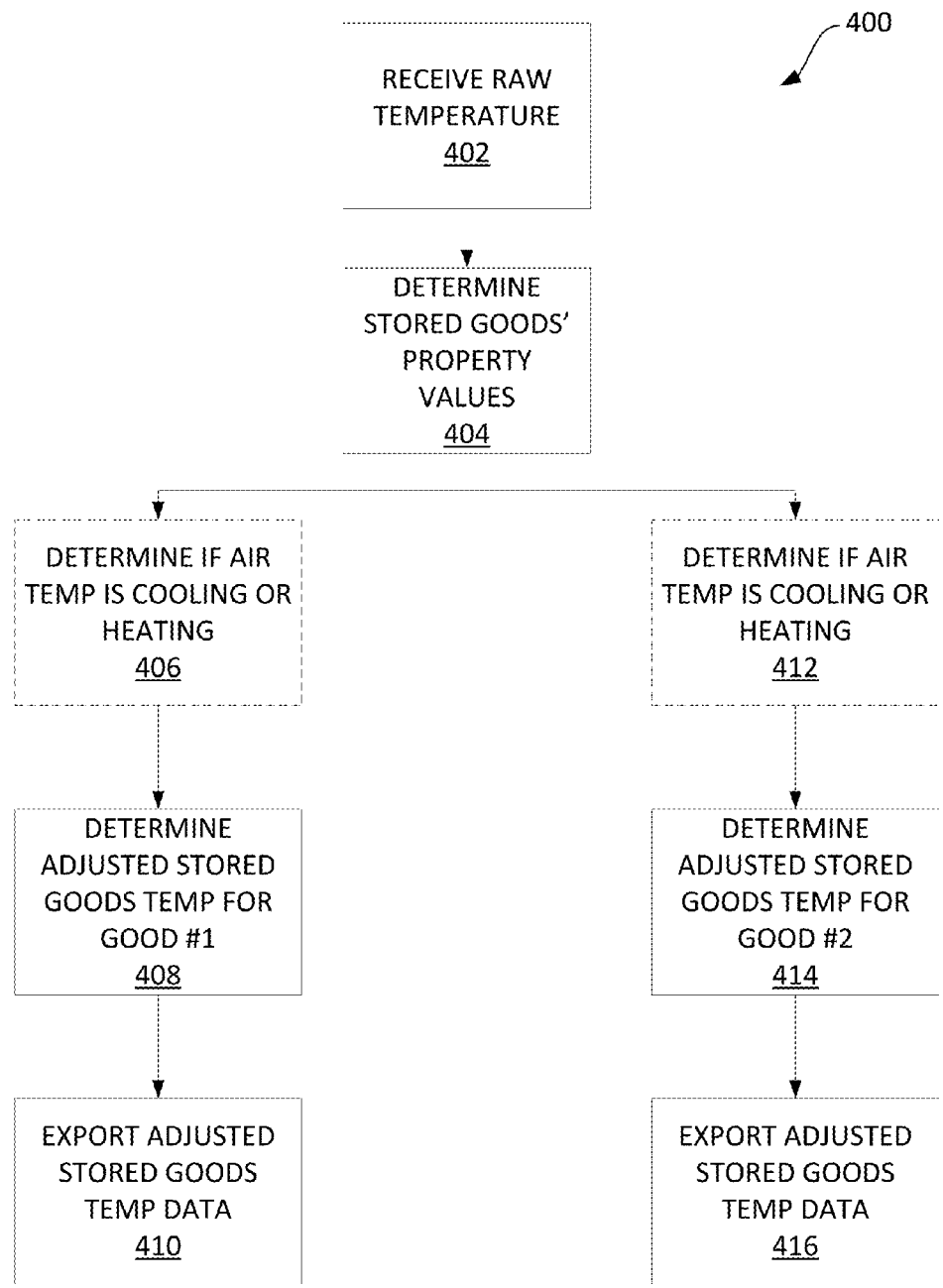
FIG. 4 depicts a method for determining the adjusted stored goods temperature of stored goods in a refrigeration unit.

FIG. 4 depicts a method 400 for determining the adjusted stored goods temperature of stored goods in a refrigeration unit. At operation 402, the raw temperature data is received. In embodiments, the raw temperature data is received by the temperature analysis unit and is transmitted from the refrigeration unit.

At operation 404, values for properties are determined or obtained for the stored goods. In some embodiments, the values are for properties such as volume, geometry, and/or density. In additional embodiments, both the $k_{warm}$ and $k_{cool}$ values are predetermined for each of the stored goods. In other embodiments, only a single k value is determined for each of the stored goods. As discussed above, the various k values may be mathematically derived, calculated or adjusted based on other properties of the stored goods, or determined from empirical testing, among other potential options.

As depicted in method 400, the adjusted stored goods temperature is determined for two different goods stored in the refrigeration unit. As should be appreciated, method 400 may be expanded to determine the adjusted stored goods temperature for any number of different stored goods. At operation 406, the change in temperature of a first stored good is analyzed to determine if the air temperature is heating or cooling. Operation 406 is performed only when a $k_{warm}$ and a $k_{cool}$ value are determined for the first stored good at operation 404. If only one k value is determined for the first stored good, then operation 406 may be omitted. At operation 408, the adjusted stored goods temperature of the first stored good is determined. After the adjusted stored goods temperature for the first stored good is determined, that adjusted stored goods temperature data is exported at operation 410. In some embodiments, the exportation of the adjusted stored goods temperature data for the first stored good also involves changing the format of the data to conform to the requirements of the device to which the data is being exported.

Operations 412-416 are substantially similar to operations 406-410, except operations 412-416 are completed for a second stored good.

Figure 5:
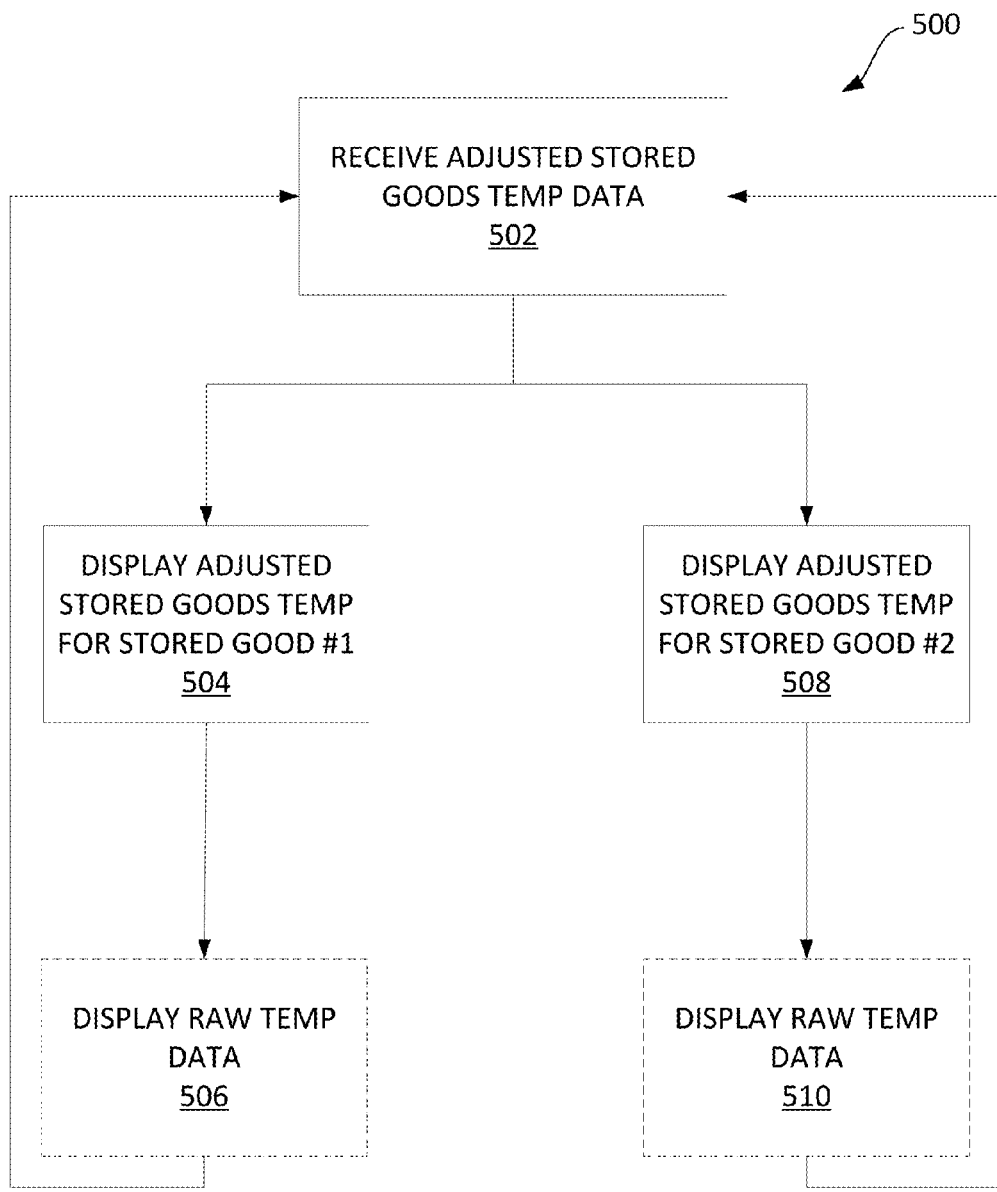
FIG. 5 depicts a method for displaying the adjusted stored goods temperature data for goods stored in the refrigeration unit.

FIG. 5 depicts a method 500 for displaying the adjusted stored goods temperature data for goods stored in the refrigeration unit. At operation 502, the adjusted stored goods temperature data is received for at least one stored good. At operation 504, the adjusted stored goods temperature data for a first good is displayed. The adjusted stored goods temperature data for the first good may be displayed in a multitude of ways. In some embodiments, the adjusted stored goods temperature data may be displayed as a graph or plot, plotting the temperature versus time of the first stored good. In other embodiments, the adjusted stored goods temperature data may be displayed as a single temperature for the first stored good. In additional embodiments, the adjusted stored goods temperature data may be displayed as entries in a table or spreadsheet, among other potential display options. At operation 506, the raw temperature data may also be displayed. In some embodiments, for comparison, the raw temperature data may be displayed alongside the adjusted stored goods temperature data for the first stored good.

Operations 508-510 are substantially similar to operations 504-506, except operations 508-510 are completed for a second stored good. Where the adjusted stored goods temperature data is displayed for multiple stored goods, the adjusted stored goods temperature data may be displayed side by side or in a similar manner to allow for comparison of the temperature of the multiple goods. While method 500 depicts operations for displaying the adjusted stored goods temperature data for only two stored goods, it will be appreciated that method 500 may be expanded to displaying data for any amount of stored goods, or even displaying data for only one stored good.

Figure 6:
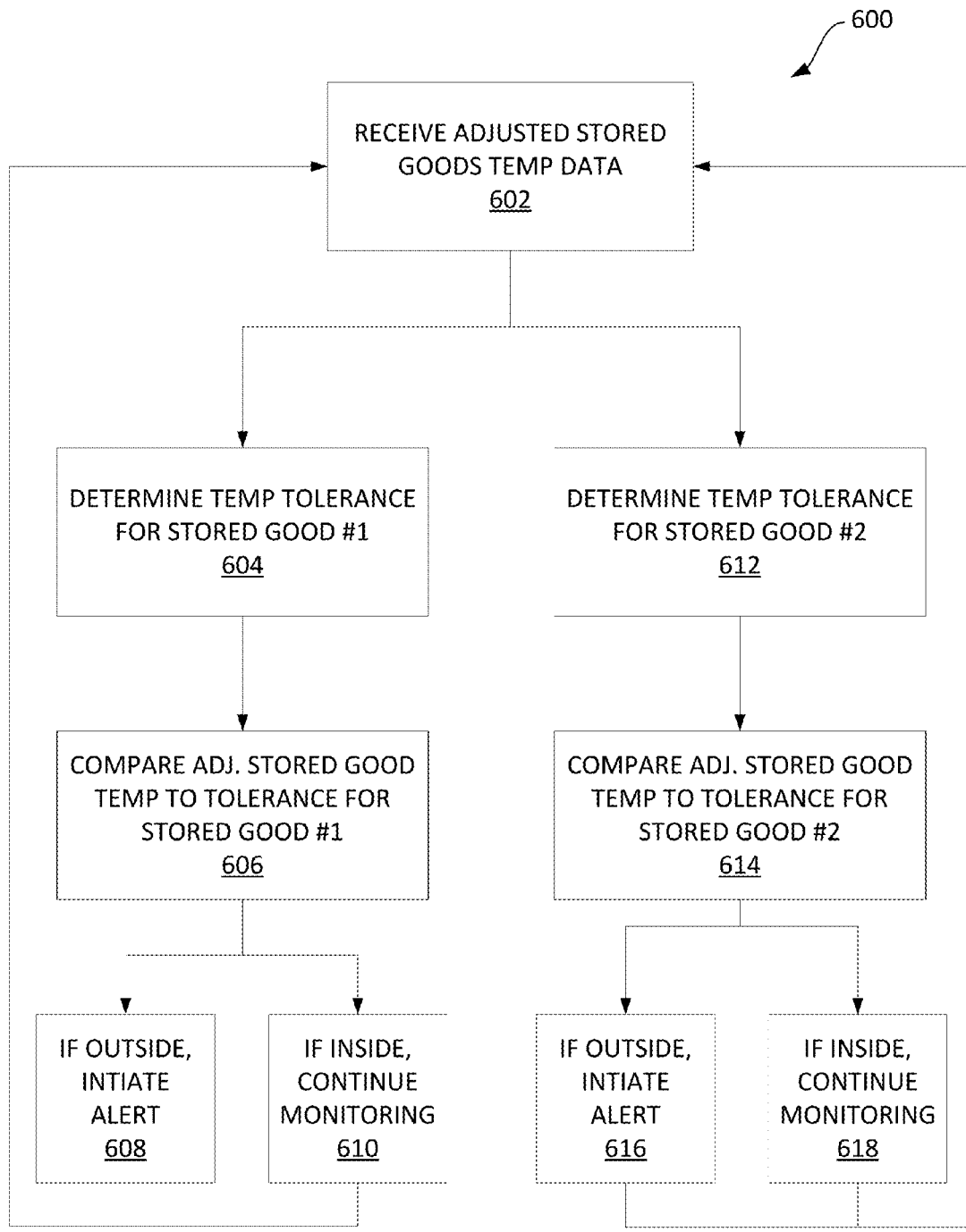
FIG. 6 depicts a method for initiating an alert or an alarm based on the adjusted stored goods temperature data for at least one stored good.

FIG. 6 depicts a method 600 for initiating an alert or an alarm based on the adjusted stored goods temperature data for at least one stored good. At operation 602, the adjusted stored goods temperature data is received for at least one stored good. At operation 604, the temperature tolerance range is determined for a first stored good. For instance, if the first stored good is a vaccine, the vaccine may need to be kept within a tight temperature range. At operation 606, the adjusted stored goods temperature data for the first stored good is compared to the temperature tolerance for the first stored good determined at operation 604.

If, based on the comparison at operation 606, the adjusted stored goods temperature data for the first stored good is outside the temperature tolerance for the first stored good, an alert or alarm is initiated at operation 608. The alarm or alert may be a visual or audible alarm. In some embodiments, the alarm or alert will indicate that action should be taken immediately to prevent the spoilage of the first stored good. Such an indication may result from a determination that the temperature of the first stored good is changing too rapidly or approaching the limit of a certain tolerance. In other embodiments, the alarm or alert may not be immediate. Rather, the alert or alarm will be recorded and indicate that the first stored good has spoiled or has potentially been outside its temperature tolerance. This type of recorded alert will notify a person when removing the first stored good that it should not be used. In an example where the first stored good is a vaccine or otherwise medicinal, the notification may prevent the potentially harmful administration of medicine that has been outside its temperature tolerance.

If the comparison at operation 606 indicates that the first stored good is within its temperature tolerance, monitoring will continue and the method 600 will repeat. Even if the first stored good is found to be outside the temperature tolerance, monitoring will continue and the method will repeat.

Operations 612-618 are substantially similar to operations 604-610, except operations 612-618 are completed for a second stored good. While method 600 depicts operations for utilizing the adjusted stored goods temperature data for only two stored goods, it will be appreciated that method 600 may be expanded to any amount of stored goods, or even for only one stored good.

Figure 7:
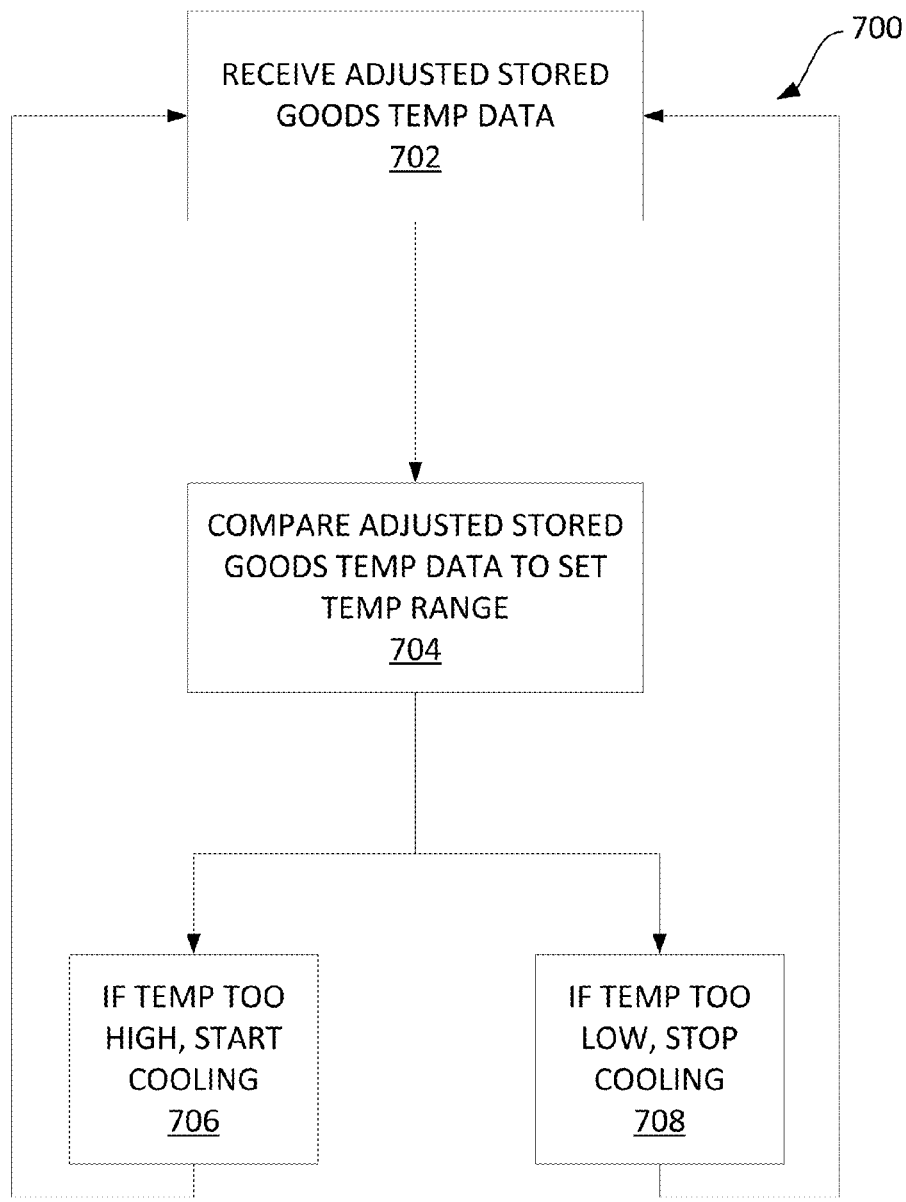
FIG. 7 depicts a method for controlling the refrigeration cycle of a refrigeration unit.

FIG. 7 depicts a method 700 for controlling the refrigeration cycle of a refrigeration unit. At operation 702, the adjusted stored goods temperature data is received for at least one stored good. For example, the stored good temperature data is received at the refrigeration unit from the temperature analysis unit. At operation 704, the adjusted stored goods temperature data is compared to the set temperature range of the refrigeration unit. If, based on the comparison in operation 704, the adjusted stored goods temperature data indicates that the temperature is too high or above the set temperature range of the refrigeration unit, cooling is initiated at operation 706. In some embodiments, initiating cooling may comprise starting the compressor of the refrigeration unit. If, based on the comparison in operation 704, the adjusted stored goods temperature data indicates that the temperature is too low or below the set temperature range of the refrigeration unit, cooling is stopped at operation 708. In some embodiments, stopping cooling may comprise stopping the compressor of the refrigeration unit.

Figure 8:
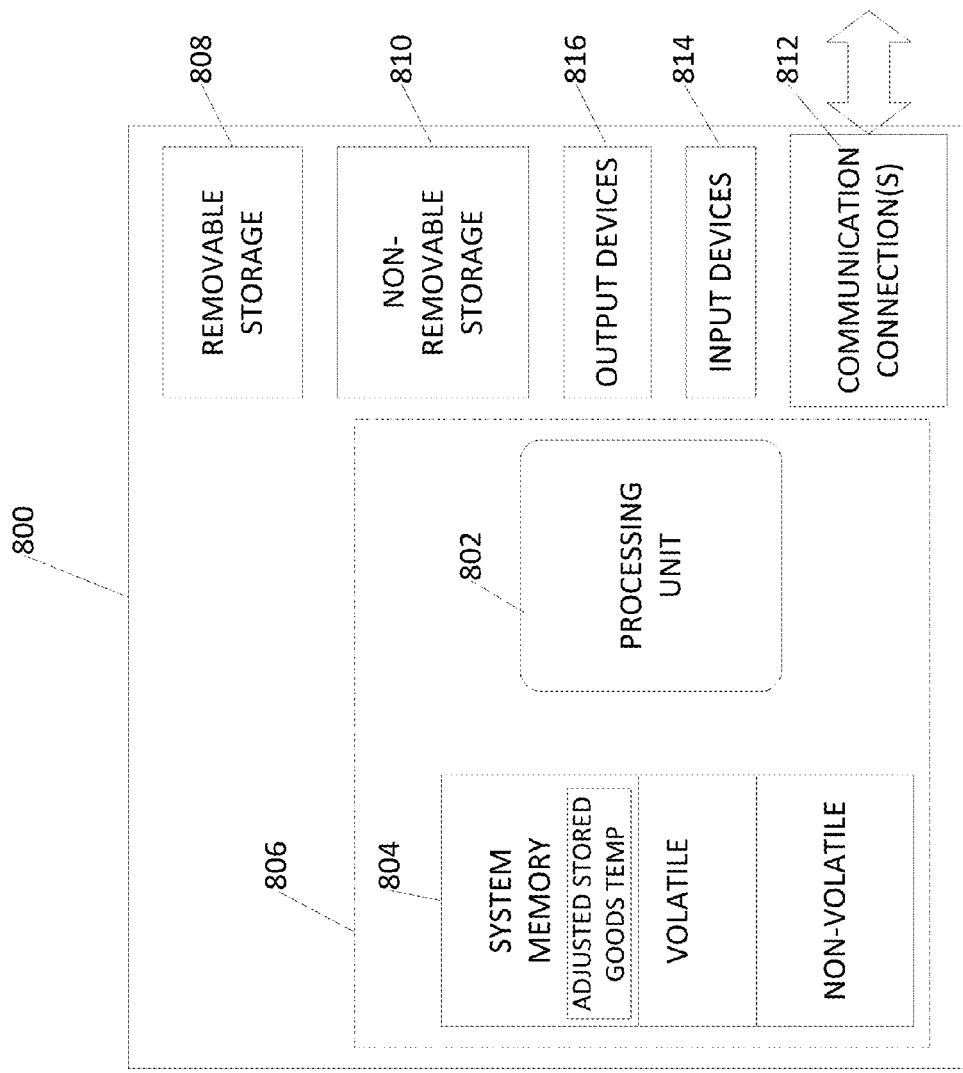
FIG. 8 illustrates one example of a suitable operating environment in which one or more of the present embodiments may be implemented.

FIG. 8 illustrates one example of a suitable operating environment 800 in which one or more of the present embodiments may be implemented, for example, the temperature analysis unit. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, virtualized systems, microprocessor-based systems, programmable logic controllers, programmable consumer electronics such as smart phones, network PCs, minicomputers, mainframe computers, smartphones, tablets, distributed computing environments that include any of the above systems or devices, and the like.

In its most basic configuration, operating environment 800 typically includes at least one processing unit 802 and memory 804. Depending on the exact configuration and type of computing device, memory 804 (storing, among other things, instructions to perform the monitoring methods described herein) may be volatile (such as RAM), non-volatile (such as ROM, flash memory, etc.), or some combination of the two. In some embodiments, the memory will contain the instructions for computing the adjusted stored goods temperature, along with the determined stored goods temperatures. This most basic configuration is illustrated in FIG. 8 by dashed line 806. Further, environment 800 may also include storage devices (removable, 808, and/or non-removable, 810) including, but not limited to, magnetic disks, optical disks, tape, or solid state media. Similarly, environment 800 may also have input device(s) 814 such as touch screens, keyboard, mouse, pen, voice input, etc. and/or output device(s) 816 such as a LEDs, display, speakers, printer, etc. Also included in the environment may be one or more communication connections, 812, such as LAN, WAN, point to point, Bluetooth, RF, WIFI, etc.

Operating environment 800 typically includes at least some form of computer readable media. Computer readable media can be any available media that can be accessed by processing unit 802 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other digital optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer storage media, as used herein, does not include communication media. Combinations of the any of the above should also be included within the scope of computer readable media.

The operating environment 800 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet. In some embodiments, the components described herein comprise such modules or instructions executable by computer system 800 that may be stored on computer storage medium and other tangible mediums and transmitted in communication media. In some embodiments, computer system 800 is part of a network that stores data in remote storage media for use by the computer system 800.

Figure 9:
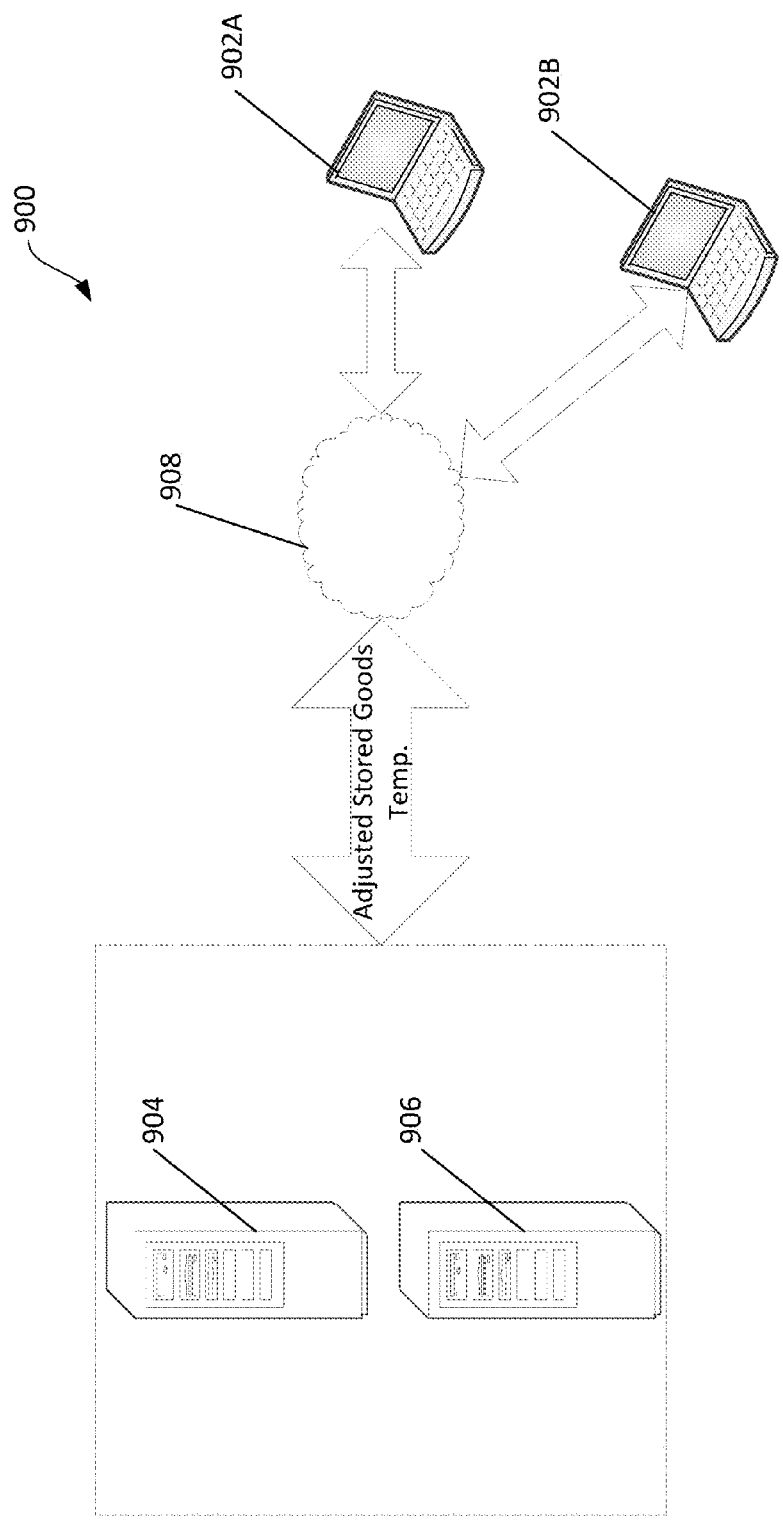
FIG. 9 is an embodiment of a network in which the various systems and methods disclosed herein may operate.

FIG. 9 is an embodiment of a network 900 in which the various systems and methods disclosed herein may operate. In embodiments, devices, such as device 902A and 902B, may communicate with each other and one or more servers, such as servers 904 and 906, via a network 908. In embodiments, a device may be a laptop, a personal computer, a smart phone, a PDA, a netbook, or any other type of computing device, such as the computing device in FIG. 9. For example, temperature analysis unit may be such a device. As another example, the utilization device may be such a device. In embodiments, servers 904 and 906 may be any type of computing device, such as the computing device illustrated in FIG. 8. Network 908 may be any type of network capable of facilitating communications between the devices 902A and 902B and one or more servers 904 and 906. Examples of such networks include, but are not limited to, LANs, WANs, cellular networks, and/or the Internet.

In embodiments, the various systems and methods disclosed herein may be performed by one or more server devices. For example, in one embodiment, a single server, such as server 904 may be employed to perform the systems and methods disclosed herein. Device 1802 may interact with server 904 via network 908 in order to access information such as, adjusted stored goods temperature data, the device 906 may also perform functionality disclosed herein.

In alternate embodiments, the methods and systems disclosed herein may be performed using a distributed computing network, or a cloud network. In such embodiments, the methods and systems disclosed herein may be performed by two or more servers, such as servers 904 and 906. Although a particular network embodiment is disclosed herein, one of skill in the art will appreciate that the systems and methods disclosed herein may be performed using other types of networks and/or network configurations.

While many of the examples discussed herein have made reference to a refrigeration unit as a type of temperature controlled unit, those having skill in the art would recognize that that the systems and methods disclosed herein would be applicable to any type of temperature controlled unit, such as heaters and/or refrigerators.

While there have been examples, instances, and embodiments described herein, other modifications of the technology will become apparent to those skilled in the art from the teachings herein. The particular systems and methods disclosed herein are exemplary in nature and are not to be considered limiting. It is therefore desired to be secured all such modifications as fall within the spirit and scope of the technology. Accordingly, what is desired to be secured by Letters Patent is the technology as defined and differentiated herein, and all equivalents.

What is claimed is:

1. A computer-implemented method for determining a temperature of goods in a temperature controlled unit, the method comprising:
   receiving raw temperature data for a first iteration, wherein the raw temperature data indicates an air temperature inside the temperature controlled unit at the first iteration;
   obtaining a property value for a good stored in the temperature controlled unit;
   based on the raw temperature data for the first iteration and the property value for the good, determining a first adjusted stored goods temperature for the good stored in the temperature controlled unit, wherein the first adjusted stored goods temperature for the good represents a first internal temperature of the good;
   receiving raw temperature data for a second iteration, wherein the raw temperature data indicates an air temperature inside the temperature controlled unit at the second iteration and the raw temperature data for the first iteration is different from the raw temperature data for the second iteration; and
   based on the raw temperature data for the second iteration and the property value for the good, determining a second adjusted stored goods temperature for the good stored in the temperature controlled unit, wherein the second adjusted stored goods temperature for the good represents a second internal temperature of the good.

2. The method of claim 1, wherein an adjusted stored goods temperature is determined for additional iterations to represent cyclical changes in raw temperature.

3. The method of claim 1, further comprising displaying data representing the first and second adjusted stored goods temperatures for the good.

4. The method of claim 1, further comprising:
   comparing data representing the first adjusted stored goods temperature of the stored good with a temperature tolerance for the good; and
   based on the comparison of the data representing the first adjusted stored goods temperature of the good and the temperature tolerance for the a good, initiating an alert.

5. The method of claim 1, further comprising:
   comparing data representing the first adjusted stored goods temperature of the good with a set temperature range of the temperature controlled unit;
   based on the comparison of the data representing the adjusted stored goods temperature of the good and the set temperature range of the temperature controlled unit, initiating cooling of the temperature controlled unit.

6. The method of claim 1, wherein the property for the good is one of the group consisting of: volume of the good, geometry of the good, and density of the good.

7. The method of claim 1, further comprising:
   determining at least one k value for the good stored in the temperature controlled unit, wherein the k value represents the combined properties of the good; and wherein
   determining the adjusted stored goods temperature for the good is further based on the k value.

8. The method of claim 7, wherein determining the adjusted stored goods temperature for the good stored in the temperature controlled unit is further based on the relationship $T(t)=T_A+(T_0-T_A)e^{-kt}$, wherein $T(t)$ represents temperature of the good at time "t"; $T_A$ represents the ambient temperature (the temperature of the surroundings); $T_0$ is initial temperature of the stored goods; k is a positive constant that represents at least one property of the stored good, and t is the time.

9. The method of claim 1, further comprising:
   determining a $k_{warm}$ and a $k_{cool}$ value for the good stored in the temperature controlled unit, wherein the $k_{warm}$ and $k_{cool}$ values represent the combined properties of the good; and wherein
   determining the adjusted stored goods temperature for the good is further based on the $k_{warm}$ and $k_{cool}$ values.

10. The method of claim 9, further comprising determining if the air temperature inside the temperature controlled unit is rising or falling.

11. The method of claim 10, wherein determining the adjusted stored goods temperature for at least one good stored in the temperature controlled unit is further based on the relationships $T_n=T_A+(T_{n-1}-T_A)e^{-kcool\Delta t}$ and $T_n=T_A+(T_{n-1}-T_A)e^{-kwarm\Delta t}$, wherein $T_n$ is the adjusted stored goods temperature of the good for the nth iteration; $T_A$ is the ambient temperature of the temperature controlled unit as measured; $T_{n-1}$ is the adjusted stored goods temperature of the stored good from the previous iteration; $k_{cool}$ is a positive constant representative of the properties of the good when a cooling condition is determined; $k_{warm}$ is a positive constant representative of the properties of the good when a warming condition is determined; $\Delta t$ is the time between measurement iteration; and n is the iteration number.

12. The method of claim 1, further comprising:
   obtaining a property value for a second good stored in the temperature controlled unit, wherein the second good is different from the first good;
   based on the raw temperature data for the first iteration and the property value for the second good, determining an adjusted stored goods temperature for the second good stored in the temperature controlled unit, wherein the adjusted stored goods temperature for the second good represents the internal temperature of the second good; and
   based on the raw temperature data for the second iteration and the property value for the second good, determining an adjusted stored goods temperature for the second good stored in the temperature controlled unit, wherein the adjusted stored goods temperature for the good represents the internal temperature of the good.

13. A system for determining the temperature of stored goods in a temperature controlled unit, the system comprising:
   a temperature analysis unit comprising a processor and a memory, wherein the memory stores instructions for causing the processor to perform the operations of:
   receiving raw temperature data, wherein the raw temperature data indicates an air temperature inside the temperature controlled unit;
   obtaining a property value for at least one good stored the temperature controlled unit;
   determining at least one k value for the good stored in the temperature controlled unit, wherein the k value represents combined properties of the good;
   based on the raw temperature data, the at least one k value, and the property value for the good, determining the adjusted stored goods temperature for the good stored in the temperature controlled unit, wherein the adjusted stored goods temperature for the good represents the internal temperature of the good.

14. The system of claim 13, the instructions further comprise instructions for causing the processor to perform the operation of determining additional adjusted stored goods temperatures for additional iterations to represent cyclical changes in raw temperature.

15. The system of claim 13, further comprising a utilization device, wherein the utilization device displays data representing the adjusted stored goods temperature of the good.

16. The system of claim 15, further comprising a utilization device, wherein the utilization device is configured to:
   compare data representing the adjusted stored goods temperature of the stored good with a temperature tolerance for the good; and
   based on the comparison of the data representing the adjusted stored goods temperature of the good and the temperature tolerance for the good, initiate an alert when the adjusted stored goods temperature is outside the temperature tolerance.

17. The system of claim 13, wherein determining the adjusted stored goods temperature for the good stored in the temperature controlled unit is further based on the relationship $T(t)=T_A+(T_0-T_A)e^{-kt}$, wherein $T(t)$ represents temperature of the good at time "t"; $T_A$ represents the ambient temperature (the temperature of the surroundings); $T_0$ is initial temperature of the stored goods; k is a positive constant that represents at least one property of the good, and t is the time.

18. The system of claim 13, wherein the instructions further comprise instructions for causing the processor to perform the operations of:
   determining a $k_{warm}$ and a $k_{cool}$ value for the good stored in the temperature controlled unit, wherein the $k_{warm}$ and $k_{cool}$ values represent the combined properties of the good; and wherein
   determining the adjusted stored goods temperature for the good is further based on the $k_{warm}$ and $k_{cool}$ values.

19. The system of claim 18, wherein determining the adjusted stored goods temperature for the good stored in the temperature controlled unit is further based on the relationships $T_n=T_A+(T_{n-1}-T_A)e^{-kcool\Delta t}$ and $T_n=T_A+(T_{n-1}-T_A)e^{-kwarm\Delta t}$, wherein $T_n$ is the adjusted stored goods temperature of the good for the nth iteration; $T_A$ is the ambient temperature of the temperature controlled unit as measured; $T_{n-1}$ is the adjusted stored goods temperature of the stored good from the previous iteration; $k_{cool}$ is a positive constant representative of the properties of the good when a cooling condition is determined; $k_{warm}$ is a positive constant representative of the properties of the good when a warming condition is determined; $\Delta t$ is the time between measurement intervals; and n is the interval number.

20. A computer-readable storage hardware device encoding computer-executable instructions that, when executed by at least one processor, perform a method for determining a temperature of goods in a temperature controlled unit, the method comprising:

receiving raw temperature data for a first iteration, wherein the raw temperature data indicates an air temperature inside the temperature controlled unit at the first iteration;

obtaining a property value for a good stored in the temperature controlled unit;

based on the raw temperature data for the first iteration and the property value for the good, determining a first adjusted stored goods temperature for the good stored in the temperature controlled unit, wherein the first adjusted stored goods temperature for the good represents a first internal temperature of the good;

receiving raw temperature data for a second iteration, wherein the raw temperature data indicates an air temperature inside the temperature controlled unit at the second iteration and the raw temperature data for the first iteration is different from the raw temperature data for the second iteration; and based on the raw temperature data for the second iteration and the property value for the good, determining a second adjusted stored goods temperature for the good stored in the temperature controlled unit, wherein the second adjusted stored goods temperature for the good represents a second internal temperature of the good.

\* \* \* \* \*